United States Patent
Dadkhah Tehrani

(10) Patent No.: US 12,216,481 B2
(45) Date of Patent: Feb. 4, 2025

(54) MOTION STEERING UNDER KINO DYNAMIC CONSTRAINTS

(71) Applicant: Lockheed Martin Corporation, Bethesda, MD (US)

(72) Inventor: Navid Dadkhah Tehrani, Providence, RI (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 151 days.

(21) Appl. No.: 18/088,215

(22) Filed: Dec. 23, 2022

(65) Prior Publication Data
US 2024/0210952 A1    Jun. 27, 2024

(51) Int. Cl.
*G05D 1/10*    (2006.01)
*B64C 39/02*   (2023.01)
*G05D 1/00*    (2024.01)

(52) U.S. Cl.
CPC ......... *G05D 1/1064* (2019.05); *B64C 39/024* (2013.01); *G05D 1/0061* (2013.01); *B64U 2201/00* (2023.01)

(58) Field of Classification Search
CPC .. G05D 1/1064; G05D 1/0061; G05D 1/2464; G05D 1/43; G05D 2105/22; G05D 2109/20; G05D 1/646; G05D 1/644; B64C 39/024; B64U 2201/00; G08G 5/00
See application file for complete search history.

(56) References Cited

U.S. PATENT DOCUMENTS

| 10,147,327 | B2  |         | 12/2018 | Nefflier et al. |           |
|------------|-----|---------|---------|-----------------|-----------|
| 10,665,115 | B2  | *       | 5/2020  | Fragoso         | G06V 10/751 |
| 2022/0155802 | A1 | *     | 5/2022  | Shvalb          | G08G 5/045 |
| 2022/0270495 | A1 | *     | 8/2022  | Pele            | G05D 1/106 |

FOREIGN PATENT DOCUMENTS

| CN | 110622081 A | 12/2019 |
| CN | 107643764 B | 6/2020 |
| WO | WO-2024099553 A1 * | 5/2024 |

OTHER PUBLICATIONS

Pharpatara, Pawit, "Trajectory Planning for Aerial Vehicles with Constraints," Sep. 2015, HAL open science, pp. 1-185 (Year: 2015).*

(Continued)

*Primary Examiner* — Peter D Nolan
*Assistant Examiner* — Demetra R Smith-Stewart
(74) *Attorney, Agent, or Firm* — Foley & Lardner LLP

(57) ABSTRACT

Motion steering under kino dynamic constraints is provided. A system can receive an indication to return to a route generated for autonomous navigation by the aircraft to a destination. The system can generate a vector field formed of a plurality of vectors that merge into the route. The vector field can be generated responsive to the indication to return to the route. The system can provide instructions to steer the aircraft toward the destination along the route via one or more vectors of the plurality of vectors in the vector field. The instructions can be based on a cost function applied to the vector field.

18 Claims, 8 Drawing Sheets

(56) References Cited

OTHER PUBLICATIONS

Karaman, Sertac et al., "Optimal Kinodynamic Motion Planning using Incremental Sampling-based Methods," Dec. 15-17, 2010, 49th IEEE Conference on Decision and Control, pp. 7681-7687 (Year: 2010).*

Pereira et al., "Kinodynamic Motion Planning on Vector Fields using RRT*" Robotics Institute, Carnegie Mellon University, dated Jul. 14, 2016 (26 pages).

Chen et al., "UAV Path Planning with Tangent-plus-Lyapunov Vector Field Guidance and Obstacle Avoidance", IEEE Transactions on Aerospace and Electronic Systems, Apr. 2013, vol. 49, No. 2, pp. 840-856.

Extended European Search Report on European Patent Application No. 23213633.3 dated Apr. 12, 2024 (8 pages).

Harinarayana et al., "A Lyapunov Guidance Vector Field Based Continuous Curvature Path Generation for Waypoint Following of UAVs", 2021 International Conference on Unmanned Aircraft Systems (ICUAS), IEEE, Jun. 15, 2021, pp. 498-506.

\* cited by examiner

MOTION STEERING UNDER KINO DYNAMIC CONSTRAINTS

FIELD OF THE DISCLOSURE

This disclosure relates to navigation of aerial vehicles.

BACKGROUND

Aerial vehicles, such as helicopters and other aircraft, can navigate to a destination along a predefined route. A deviation from a predefined route can provide a navigational challenge in one or more circumstances.

SUMMARY

This technical solution is directed to aerial vehicle navigation. The technical solution can include techniques for determining or navigating a path of an aerial vehicle in response to a deviation such as an obstacle along the path, or a manual flight control deviating from a predefined route. A data processing system of or associated with an aerial vehicle can generate or receive a route to navigate to a destination. The route can be generated in view of kino dynamic constraints associated with the aerial vehicle, such that the aerial vehicle can traverse the route. The data processing system can determine a deviation from the route or determine an obstacle indicative of a future deviation from the route. The data processing system can generate a vector field for an environment. Various vectors of the vector field can provide directional information to merge with the route from various locations of the environment.

The data processing system can employ a technique such as a closed loop rapidly-exploring random tree (CL-RRT) to generate various return paths to the route. The return paths can be generated or pruned based on kino dynamic constraints associated with the aerial vehicle, such as minimum turn radius, maximum back angle, maximum rate of climb, etc. The data processing system can determine a cost function for the various return paths to merge with the route. The data processing system can select a return path based on the cost function (e.g., a lowest cost return path), and cause the aerial vehicle to traverse the return path to return to the route.

An aspect of the present disclosure can relate to a system. The system can include a data processing system of an aircraft. The data processing system can include one or more processors coupled with memory. The system can receive an indication to return to a route generated for autonomous navigation by the aircraft to a destination. The system can generate a vector field formed of a plurality of vectors that merge into the route. The vector field can be generated responsive to the indication to return to the route. The system can provide instructions to steer the aircraft toward the destination along the route via one or more vectors of the plurality of vectors in the vector field. The instructions can be based on a cost function applied to the vector field.

In some implementations, the system can generate the instructions for the one or more vectors based on kino dynamic constraints of the aircraft. In some implementations, each of the vectors includes a respective direction for each respective point in an environment surrounding the aircraft configured to steer the aircraft towards the destination via the route. In some implementations, the system can generate the vector field for an environment having a radius surrounding the aircraft. In some implementations, the system can cause the aircraft to navigate in accordance with the instructions. In some implementations, the system can generate the instructions to steer the aircraft via the one or more vectors to minimize the cost function. In some implementations, the system can generate the instructions to steer the aircraft via the one or more vectors to reduce the cost function below a threshold. In some implementations, the system can generate the instructions for the one or more vectors with a closed loop rapidly exploring random technique configured with kinodynamic constraints for the aircraft. In some implementations, the system can generate the instructions to steer the aircraft via the one or more vectors that avoid an obstacle in an environment centered around the aircraft. In some implementations, the system can enter a manual mode in which an operator of the aircraft navigates the aircraft via one or more inceptors. In some implementations, the system can detect the indication to transition from the manual mode to an autonomous mode in which the aircraft autonomously navigates along the route. In some implementations, the system can detect the indication responsive to release by the operator of the one or more inceptors for a predetermined duration. In some implementations, the system can detect the indication responsive to an input via a user interface of the aircraft.

An aspect of the present disclosure can relate to a method. The method can be performed by a data processing system of an aircraft including one or more processors coupled to memory. The method can include receiving an indication to return to a route generated for autonomous navigation by the aircraft to a destination. The method can include generating a vector field formed of a plurality of vectors that merge into the route. The vector field can be generated in response to the indication to return to the route. The method can include providing instructions to steer the aircraft toward the destination along the route via one or more vectors of the plurality of vectors in the vector field. The instruction can be provided based on a cost function applied to the vector field.

In some implementations, the method can include generating the instructions for the one or more vectors based on kino dynamic constraints of the aircraft. In some implementations, each vector of the plurality of vectors can include a respective direction for each respective point in an environment surrounding the aircraft configured to steer the aircraft towards the destination via the route. In some implementations, the method can include generating the vector field for an environment having a radius surrounding the aircraft. In some implementations, the method can include causing the aircraft to navigate in accordance with the instructions. In some implementations, the method can include generating the instructions to steer the aircraft via the one or more vectors to minimize the cost function.

An aspect of the present disclosure can relate to an aircraft. The aircraft can include a data processing system comprising one or more processors coupled with memory. The data processing system can receive an indication to return to a route generated for autonomous navigation by the aircraft to a destination. The data processing system can generate a vector field formed of a plurality of vectors that merge into the route. The vector field can be generated in response to the indication to return to the route. The data processing system can provide instructions to steer the aircraft toward the destination along the route via one or more vectors of the plurality of vectors in the vector field. The instructions can be provided based on a cost function applied to the vector field.

In some implementations, the data processing system can generate the instructions for the one or more vectors based on kino dynamic constraints of the aircraft.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which can be carried on appropriate carrier media (computer readable media), which can be tangible carrier media (e.g. disks or other non-transitory storage media) or intangible carrier media (e.g. communication signals). Aspects can also be implemented using suitable apparatus, which can take the form of programmable computers running computer programs arranged to implement the aspects. As used in the specification and in the claims, the singular form of "a," "an," and "the" include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Figure 1:
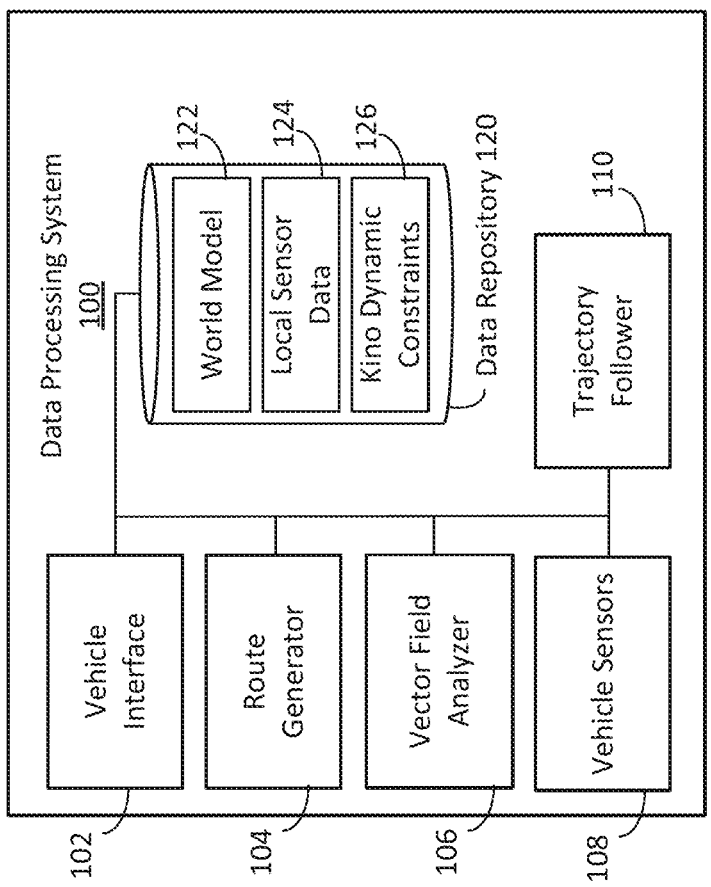
FIG. 1 illustrates a block diagram of an example data processing system, in accordance with one or more implementations.

In the following detailed description, reference is made to the accompanying drawings, which form a part hereof. In the drawings, similar symbols typically identify similar components, unless context indicates otherwise. The illustrative implementations described in the detailed description, drawings, and claims are not meant to be limiting. Other implementations can be utilized, and other changes can be made, without departing from the spirit or scope of the subject matter presented. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The systems, apparatuses, and methods described herein navigate aerial vehicles responsive to a deviation from a route. For example, a pilot of the aerial vehicle can manually steer an aerial vehicle to deviate from the route, or an obstacle along the route can cause a deviation therefrom. This technical solution determines a return path to the route. This technical solution can generate a vector field for an environment including the route. The vector field can include vectors merging to the route. A return path can be generated traversing the vector field to return to the route. The return path can be generated or filtered based on kino dynamic constraints of an aerial vehicle via a motion planner such as closed-loop RRT. The return path can be associated with a cost. For example, the cost can be indicative of a portion of the return path traveled against the vector field. The execution of the systems, apparatuses, and methods described herein can cause the aerial vehicle, or data processing system thereof, to determine a return path to a route without violating kino dynamic constraints of the aerial vehicle.

Referring now to FIG. 1, illustrated is a block diagram of an example data processing system 100, in accordance with one or more implementations. The data processing system 100 can include at least one vehicle interface 102. The data processing system 100 can include at least one route generator 104. The data processing system 100 can include at least one vector field analyzer 106. The data processing system 100 can include at least one vehicle sensor 108. The data processing system 100 can include at least one trajectory follower 110. The data processing system 100 can include at least one data repository 120.

The vehicle interface 102, route generator 104, vector field analyzer 106, vehicle sensor 108, or trajectory follower 110 can each include one processing unit or other logic device such as programmable logic array engine, or module configured to communicate with the data repository 120 or database. The vehicle interface 102, route generator 104, vector field analyzer 106, vehicle sensor 108, or trajectory follower 110 can be separate components, a single component, or part of the data processing system 100. The data processing system 100 can include hardware elements, such as one or more processors, logic devices, or circuits. For example, the data processing system 100 can include one or more components, structures or functionality of a computing device depicted in FIG. 8.

The data repository 120 can include one or more local or distributed databases, and can include a database management system. The data repository 120 can include computer data storage or memory and can store one or more data elements for a world model 122, local sensor data 124, or kino dynamic constraint 126. The world model 122 can include major terrain features such as mountains or valleys, or restricted airspace. Restricted airspace can include lateral or vertical components. For example, restricted airspace can include some or all elevations within a lateral boundary, or all airspace in excess of an elevation above ground level or a terrain feature, such as for nape-of-the-earth (NoE) flight. The predefined route can be based on the kino dynamic constraints 126 of an aerial vehicle, and include motion along a three dimensional environment (e.g., by a vehicle having six degrees of freedom). The local sensor data 124 can include information relating to a local environment such as the position of additional vehicles, vegetation, or snow drifts. The local sensor data 124 can include environmental data such as vehicle information (e.g., speed, position, heading, or rotation) or weather conditions (e.g., wind speed, air density, or the like).

The kino dynamic constraints 126 can include information relating to a locomotion of an aerial vehicle. For example, a maximum or minimum airspeed, a maximum allowed climb rate, a maximum allowed rotational speed, minimum turn radius, or a maximum allowed thrust associated with the aircraft which are a function of vehicle mass, density, or altitude. The kino dynamic constraints 126 can be constraints of the aerial vehicle, the crew or other passengers, or a cargo thereof. The data processing system 100 can select, from the data repository 120, various kino dynamic constraints 126 such as a crewed kino dynamic constraint 126 or un-crewed kino dynamic constraint 126. The various kino dynamic constraints 126 can be selected by the data processing system 100 by manual entry, aircraft condition, route type, environmental condition, or the like.

Still referring to FIG. 1, and in further detail, the data processing system 100 can include at least one vehicle interface 102 designed, constructed or operational to control the path of travel of an aerial vehicle. The vehicle interface 102 can include autonomous navigation controls or manual navigation controls. The vehicle interface 102 can include a state control to alternate between various states or modes of operation. For example, the state control of the vehicle interface 102 can transition the aerial vehicle between autonomous and manual modes of operation (e.g., semi-autonomous modes of operation) based on a presence or absence of user input, or responsive to a user command. Manual modes of operation can include a manual actuation of various aircraft portions by a pilot of the aerial vehicle, or a manual entries of airspeed, headings, or other flight controls in real time, such as by a pilot or remote operator of the aircraft.

The vehicle interface 102 can include manual flight controls (e.g., throttle, anti-torque controls or a cyclic control). The manual flight controls can include manual control of various aircraft portions such as main rotor tilt (e.g., via a swashplate), throttle, or tail rotor control. The manual controls can include combinatorial control of various aircraft portions such as via a collective control. The manual flight controls can receive user input during manual operation to navigate the aircraft. A mixing unit, detection unit for the state control, or semi-autonomous system can intermediate the various manual controls and respective aircraft portions. For example, a semi-autonomous flight control input (e.g., an autonomy inceptor) can receive an input from a pilot, determine one or more instructions to realize the input, and convey the instructions to various portions of the aircraft.

Although various examples provided herein may refer to rotary aircraft or components thereof, such references are not intended to be limiting. The systems and methods disclosed herein can be applied to various vehicles including fixed wing aircraft. For example, the vehicle control interface 102 can include a control yoke or autonomous systems to manipulate ailerons, elevators, rudders, or the like, and may omit anti-torque controls or a cyclic control according to a particular vehicle control interface 102.

The detection unit can detect an engagement of a manual control. A manual flight control (e.g., a semi-autonomous input) can detect a user input during operation. The vehicle interface 102 can transition, responsive to the detect input, from an autonomous flight mode to a manual flight mode. The detection unit can detect a lack of user input. For example, the detection unit can detect a lack of user input for a time exceeding a threshold (e.g., 3 seconds, 5 seconds, or 10 seconds). Responsive to the detected lack of input, the vehicle interface 102 can transition to an autonomous mode of operation.

The vehicle interface 102 can present information to a pilot via a graphical user interface (GUI) or various visual or audio indicators (e.g., audible alarms, LEDs, or haptic feedback). The GUI can present information such as a position of a vehicle, a route associated with the aerial vehicle, or a return path to the route. The vehicle interface 102 can include one or more inputs such as buttons (e.g., a keypad) or touchscreens, levers, pedals, and the like. The vehicle interface 102 can receive indications of transitions between modes of operation (e.g., manual or autonomous modes of operation) from the pushbuttons. For example, prior to an expiration of a time exceeding a threshold, the vehicle interface 102 can receive an indication to transition to an autonomous mode, or to remain in a manual mode of operation. Various routes, paths to return to routes, or indications of a mode of operation can be presented by the GUI.

The data processing system 100 can include at least one route generator 104 designed, constructed or operational to establish a path of travel between locations. As discussed herein, a route can be a path of travel which is defined continuously or as a series of waypoints. Each waypoint can include heading information, a 3D position, or a velocity. The route generator 104 can determine a route or a return path thereto based on the world model 122 data, local sensor data 124, or kino dynamic constraints 126. For example, the route generator 104 can determine a route or a return path thereto based on weather conditions, terrain, or other obstacles (e.g., structures, air space restrictions, or desired travel corridors). The route generator 104 can generate the route prior to the aerial vehicle traversing all or a portion of the route, such as prior to a liftoff of the aerial vehicle. The route generator 104 can base the route on a various parameters. For example, the route generator 104 can implement a cost function to minimize or otherwise adjust a route distance, fuel use, time to transit the route, or an amount of acceleration at one or more points along the route.

During navigation, the aerial vehicle can depart from the route. For example, a pilot in or otherwise associated with the aerial vehicle can manually adjust the flight path of the aerial vehicle to deviate from the route, or an autonomous flight system can receive an indication of an obstacle or other condition (e.g., airspace or weather restriction) indicative of a departure from the route, such as a condition detected by a vehicle sensor 108. The route generator 104 can, responsive to the detection of the obstacle or deviation from the route, generate a path to return to the route.

The route generator 104 can determine a route or return path based on a search-based, sample-based, or optimization-based algorithm. For example, the route generator 104 can employ at least one A*, rapidly exploring random trees (RRT), or particle swarm optimization (PSO) technique. The route generator 104 can employ various predictive based motion planning techniques such as model predictive control (MPC) or closed loop RRT (CL-RRT). The route generator 104 can avoid potential obstacles on the return path, on the route, or otherwise present in an environment. The route generator 104 can determine the return path based on a kino dynamic constraint 126 of the aerial vehicle, such that the return path is viable for the aerial vehicle or any associated crew or cargo. The route generator 104 can provide one or more routes to the vector field analyzer 106 to determine a cost therewith. The route generator 104 can generate paths or portions thereof based on feedback from the vector field analyzer 106. For example, the route generator 104 can increase a number of portions of a potential path for paths having a relatively low cost associated therewith, or decrease a number of portions of a path for paths having a relatively high cost associated therewith. The route generator 104 can increase a path length or select a direction of a portion of the cost based on feedback from the vector field analyzer.

The data processing system 100 can include at least one vector field analyzer 106 designed, constructed or operational to determine a cost associated with a return path or a portion thereof. The vector field analyzer 106 can generate a vector field based on a position of an aerial vehicle, a route associated with the aerial vehicle, a destination associated with the route, or an obstacle. For example, the vector field analyzer 106 can define a substrate for the vector field, such as a rectilinear grid. The rectilinear grid can be oriented to cardinal directions. For example, gridlines can be aligned with latitudinal lines, or longitudinal lines. The grid can include a resolution based on a size, speed, or turn radius of an aerial vehicle, or a compute power of the data processing system 100. The grid can include a same or different resolution as other portions of the data processing system 100. For example, an obstacle avoidance system can operate at 10 meter or 1 meter intervals, and the gridlines can be defined at 50 meter, 100 meter interval, or 200 meter intervals. The grid can be a two dimensional grid, or a three dimensional grid. For example, the grid can be aligned to Cartesian, polar, or other coordinate systems in real space, or along a projection thereof.

For each gridline intersection of the grid, or intersections within a distance (e.g., a radius) of the aerial vehicle or the route, an origin can be defined, and a vector can be calculated with respect to the route. For example, the vector can be determined based on a direction to the route or a waypoint thereof, or by a direction of travel along the route. Transit along the vector can thus merge into the route. In some implementations, travel directly along the vectors can violate a kino dynamic constraint 126 of an aerial vehicle (e.g., can exceed an available thrust, turn radius, g-force, attitude, or the like). The vector field analyzer 106 can compare a return path to the vector field. For example, the vector field analyzer 106 can determine a cost for each segment of a return path corresponding to one or more vectors of the vector field that are adjacent to the discretized points along the return path (e.g., based on a dot product therebetween). The vector field analyzer 106 can sum the costs to generate a return path cost. The vector field analyzer 106 can compare the return path costs associated with return paths to each other or to a threshold. For example, the vector field analyzer 106 can determine a return path cost is below a threshold, and thereafter provide the return path to the trajectory follower 110 to steer the aircraft along the return path having the cost below the threshold. The vector field analyzer 106 can select a return path based on the cost. The vector field analyzer 106 can select a return path having a lowest cost for provision to the trajectory follower 110 to navigate the selected return path.

The data processing system 100 can include at least one vehicle sensor 108 designed, constructed or operational to detect environmental conditions associated with an aerial vehicle. For example, the vehicle sensor 108 can detect a wind speed (e.g., averaged, maximum, or current). The vehicle sensor 108 can detect additional vehicles, terrain features, structures, and the like. For example, the vehicle sensor 108 can include a terrain following radar or other terrain awareness or monitoring systems. The vehicle sensors 108 can provide additional terrain detail relative to the world model 122. The vehicle sensors 108 can detect a position, direction of travel, or other information of additional vehicles. The vehicle sensor 108 can provide the local sensor data 124 to the route generator 104, the vehicle interface 102, or the data repository 120 for distribution throughout the data processing system 100.

The vehicle sensor 108 can be mounted on the interior or the exterior of the aerial vehicle. Non-limiting examples of the vehicle sensors 108 include LiDAR sensors, visible light sensors (e.g., cameras, video capture devices, etc.), infrared light sensors, accelerometers, gyroscopes, magnetometers, elevation sensors, pressure sensors, temperature sensors, force sensors, proximity sensors, radar sensors, angle-of-attack sensors, global positioning system (GPS) sensors, thermal infrared cameras, and thermal imaging cameras, among others. In some implementations, one or more of the sensors can provide local sensor data 124 periodically (e.g., in a batch transmission, etc.). In some implementations, one or more of the sensors can provide local sensor data 124 upon receiving a corresponding request for sensor data from the route generator 104. The sensors can provide raw measurements, which can be stored in the memory as part of the local sensor data 124. A vehicle sensor 108 can determine an air speed or ground speed of the aerial vehicle, an elevation of the aerial vehicle, or an orientation of the aerial vehicle. The orientation of the aerial vehicle can include roll, pitch, and yaw, as well as a relative position of a control surface (e.g., a rotor, or an aerodynamic surface) relative to the wind or another object.

The data processing system 100 can include at least one trajectory follower 110 designed, constructed or operational to navigate the aerial vehicle along a route or a return path thereto. For example, the trajectory follower 110 can directly control the flight of the aerial vehicle (e.g., in an autonomous aerial vehicle) to navigate a route or return path determined or received by the data processing system 100. The trajectory follower 110 can maneuver the aircraft based on sensed or determined information. For example, the trajectory follower 110 can receive a set of waypoints determined from the route generator 104 based on a detection of an obstacle, and control the operation of the aircraft responsive to the waypoints. For example, the trajectory follower 110 can maneuver the aerial vehicle to avoid an obstacle or return to a route based on a route or heading provided by the route generator 104. The trajectory follower 110 can maneuver the aerial vehicle to traverse the return path. For example, an autonomous or semiautonomous flight control system can provide one or more waypoints to the trajectory follower 110. The trajectory follower 110 can perform one or more navigational actions to maneuver the vehicle from a first waypoint to a second waypoint.

Figure 2:
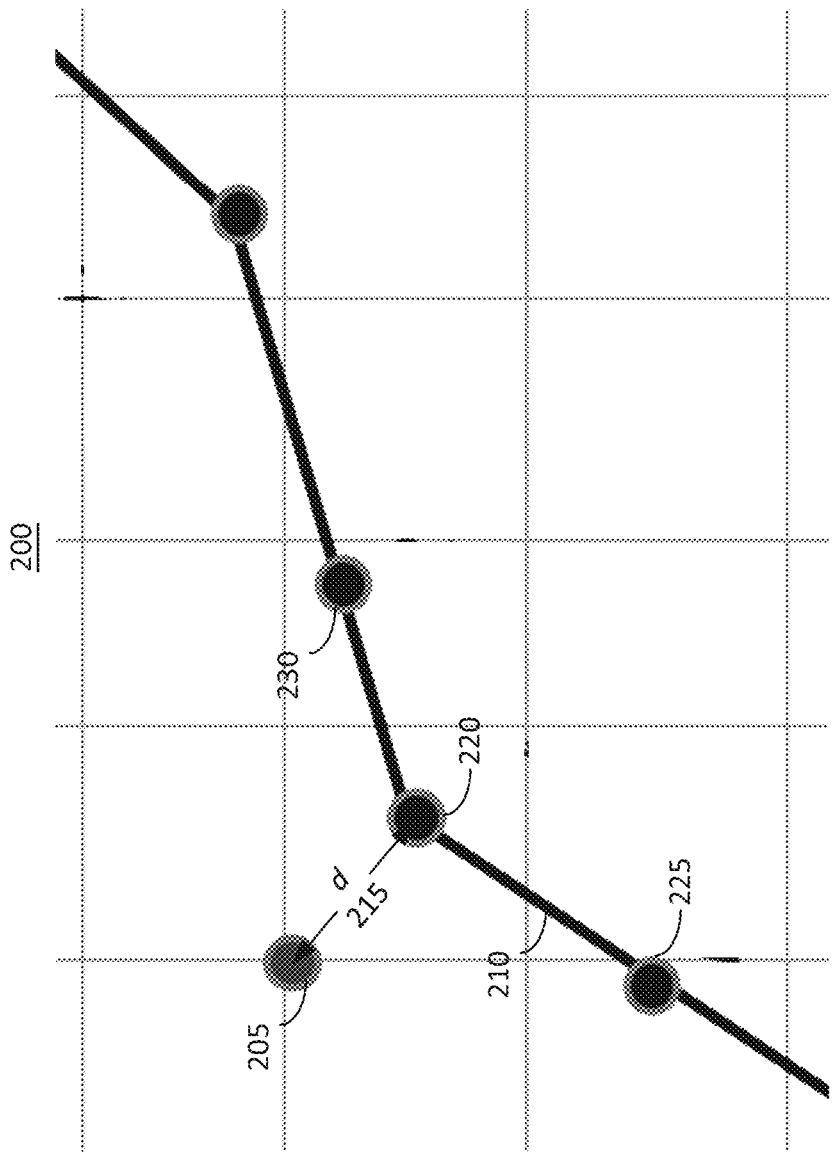
FIG. 2 illustrates a gridded terrain map in relation to a route of an aerial vehicle, in accordance with one or more implementations.

Referring to FIG. 2, illustrated is an example representation of a gridline intersection 205 disposed along an gridded environment 200 including a portion of a route 210 including various waypoints. The vector field analyzer 106 can define vectors at each of the gridline intersections 205 of the environment. The environment can be centered on the aerial vehicle, or defined with respect to the route 210, destinations or waypoints thereof. The route generator 104 or the vector field analyzer 106 can define waypoints along the route 210. The waypoints can be defined according to a distance along the route 210 such as a route distance, or a transit time. The waypoints can be spaced regularly (e.g., equally) along the route 210. The vector field analyzer 106 can associate the waypoints with a direction of travel along the route 210. For example, the vector field analyzer 106 can number, name, or otherwise identify waypoints according to a sequence of travel along the route 210. The vector field analyzer 106 can identify a nearest waypoint 220 to the gridline intersection 205. The vector field analyzer 106 can identify other waypoints along the route 210 with reference to the nearest waypoint 220. For example, a previous waypoint 225, and subsequent waypoint 230 can be identified according to a direction of travel. The vector field analyzer 106 can determine a distance, d 215 between the gridline intersection 205 and a nearest waypoint 220 thereto. The vector field analyzer 106 can determine d 215 by subtracting the three-dimensional location of waypoint 220 from the gridline intersection 205, and normalizing the resulting vector.

The vector field analyzer 106 can determine a direction of travel at the nearest waypoint 220. The vector field analyzer 106 can determine the direction of travel with respect to a subsequent waypoint 230 or a previous waypoint 225. For example, the vector field analyzer 106 can define a direction vector, R by subtracting the nearest waypoint 220 from the subsequent waypoint 230. The vector field analyzer 106 can decompose the direction vector, R, to determine constituent portions thereof (e.g., $r_x$ and $r_y$ according to a two dimensional Cartesian environment, or $r_x$, $r_y$, and $r_z$ according to a three dimensional Cartesian environment). The vector field analyzer 106 can define a direction, $\Psi$, by the inverse tangent of $(r_x/r_y)$. The vector field analyzer 106 can determine a relative vector of the gridline intersection 205 with respect to the nearest waypoint 220, f. The vector field analyzer 106 can decompose the relative vector f into, for example, an x component, $f_x$, and a y component, $f_y$. The vector field analyzer 106 can compare a product of the x component of the relative vector and the y component of the direction vector to determine a greater of the two, such as by determining a positivity or negativity of a difference thereof (e.g., according to $s=(\text{sign}(-r_x f_y + r_y f_x))$.

The vector field analyzer 106 can thereafter determine the vector direction for the gridline intersection 205 according to the following formula. As provided below, k depicts a constant which can be selected according to a desired rate of return to a route. Larger values of k can cause the vehicle to return to the route relatively sharply; smaller values may cause the vehicle to return to the route relatively gradually. For example, k can be selected from values greater than 0 and less than 1 (e.g., a value which is less than 0.1, such as about 0.01). The vector magnitude can be normalized (e.g., can be defined as 1):

$$\begin{bmatrix} \cos(\psi) & -\sin(\psi) \\ \sin(\psi) & \cos(\psi) \end{bmatrix} \begin{bmatrix} 1 \\ k*d*s \end{bmatrix}$$

The various vectors can be generated responsive to an environment surrounding the vehicle (e.g., the vector field can be constantly refreshed during aircraft transit) or the vectors can be generated responsive to a deviation of an aerial vehicle from the route 210, which can reduce compute demands or energy usage. The vehicle sensors 108 can determine a position of the aerial vehicle. The route generator 104 can determine the aerial vehicle has deviated from the route 210. For example, the route generator 104 can receive an indication from the vehicle interface 102 to resume route pathing or determine that the aerial vehicle has exceeded a threshold distance from the route 210 (e.g., based on local sensor data 124). The vector field analyzer 106 can generate a vector to determine a cost function at various positions within an environment. The environment can be a three dimensional environment associated with an aerial vehicle having six degrees of freedom. Merely for brevity and clarity of description, FIG. 2 depicts a two dimensional representation of the environment. One skilled in the art will realize that the techniques of the present disclosure can be applied to an arbitrary number of dimensions and corresponding coordinate systems (e.g., three-dimensional real space). Some vectors can be omitted which may accelerate processing. For example, a vector corresponding to an obstacle, such as terrain, or a restricted elevation for nape-of-the-earth flight can be omitted. The process can be repeated to generate each vector for a desired vector field. For example, the vector field of FIG. 3 can be defined thusly.

Figure 3:
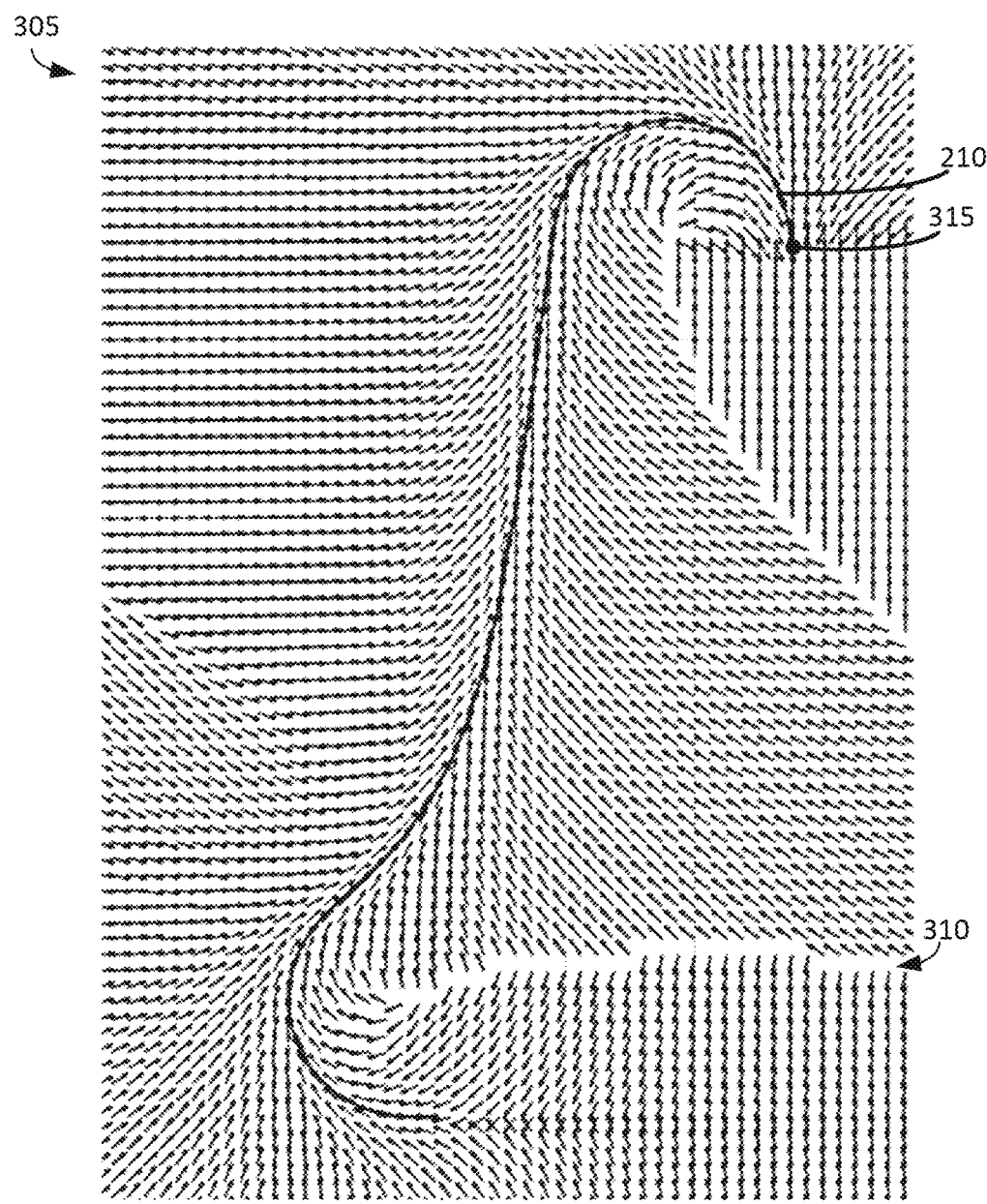
FIG. 3 illustrates an example vector field for a route of an aerial vehicle in relation to an environment, in accordance with one or more implementations.

Referring now to FIG. 3, illustrated is an example representation of a vector field 305. The vector field 305 can be generated along a route 210 terminating at one or more destinations 315 or waypoints. The vector field 305 can be generated along an entirety of the route 210 or a portion thereof, such as a portion centered around a position of an aerial vehicle. For example, the vector field 305 can be generated for a distance around an aerial vehicle according to a predefined distance or computational performance (e.g., based on a variable speed, gridline distance, available compute resources, or the like). Although depicted in two dimensions for brevity and clarity of the figures, the vector field 305 can be generated in three dimensional space around a vehicle, such that the paths and courses through the vector field can be traversed by a path or course in three dimensions. The vector field 305 can include paths of travel not realizable in conjunction with one or more sets of kino dynamic constraints 126. For example, the vector field 305 can include discontinuities 310 (e.g., areas of abrupt directional change within the vector field 305). The discontinuities 310 can include adjacent vectors having changes of directionality exceeding a rotational acceleration of one or more aerial vehicles. Indeed, the vector field 305 can be determined absent an input of kino dynamic constraints 126, such that a return path to the route 210 having a minimum cost associated therewith may not be realizable by one or more aircraft, crews, cargoes, or the like.

Figure 4:
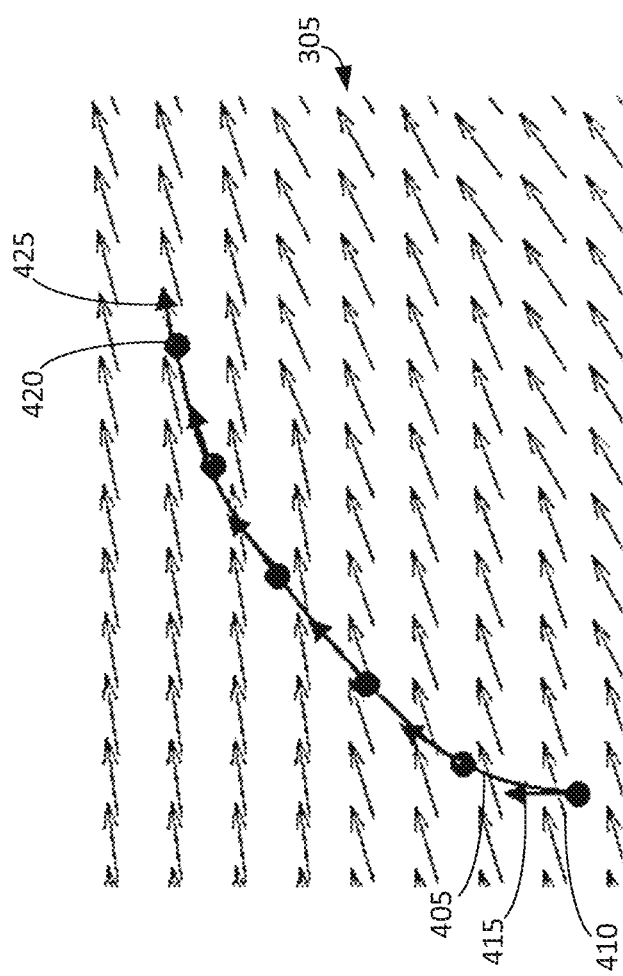
FIG. 4 illustrates an example visual representation of a cost function for an aerial vehicle navigating a return path, in accordance with one or more implementations.

Referring now to FIG. 4, the vector field analyzer 106 determines cost for one or more paths traversing the vector field 305. For example, the directionality of the vector field 305 can be associated with the cost function such that a portion of a path aligned with the vector field 305 can generate a minimum cost and a portion of the path unaligned with the vector field 305 (e.g., opposing the vector field 305) can generate a maximum cost. The vector field analyzer 106 can overlay a potential return path 405 over the vector field 305 through three-dimensional space, as depicted in two dimensions for clarity and brevity of the figures. The vector field analyzer 106 can determine a series of waypoints along the vector field analyzer 106. The vector field analyzer 106 can associate a first waypoint 410 with a first ground course 415. The first ground course 415 can include a direction of travel or a velocity for the aerial vehicle. The vector field analyzer 106 can associate at least one vector of the vector field 305 with the first waypoint 410. For example, the vector field analyzer 106 can select a closest vector or vector origin or can select multiple vectors (e.g., for linear interpolation therebetween or a selection of a closest coordinate in the x direction for an x direction component of a vector and a closest coordinate in a y direction for a y direction component of the vector).

The vector field analyzer 106 can determine a conformity of the first ground course 415 along the path of travel with any associated vectors of the vector field 305. For example, the vector field analyzer 106 can determine a dot product between the first ground course 415 and a closest vector of the vector field 305. Thusly, travel perpendicular to the vector field 305 can generate zero cost, and any deviation therefrom can assume cost (e.g., according to a sine or tangent thereof). A path of travel along the vector field 305 can accrue negative cost and a path of travel opposed to the vector field 305 can accrue positive cost. Such a cost can be determined for each waypoint along the potential return path 405 until a final waypoint 420 and final ground course 425 is reached. The costs can be summed to determine a total cost of the potential return path 405.

Because the route generator 104 can generate various paths in view of kino dynamic constraints 126 of the aerial vehicle, the realizable paths of travel may not be aligned with the vector field 305 (e.g., because the vector field 305 can include discontinuities 310 or other paths which are not compatible with one or more kino dynamic constraint 126 associated with an aerial vehicle.) The function is generated for one or more paths traversing the vector field 305. By summing values for various segments of the vector field 305, a path having a minimum cost can be determined or selected. Put differently, satisfying the kinodynamic constraints can be performed by the closed loop RRT or model predictive control algorithm. The vector fields can guide the return path along a lowest cost path of travel.

Figure 5:
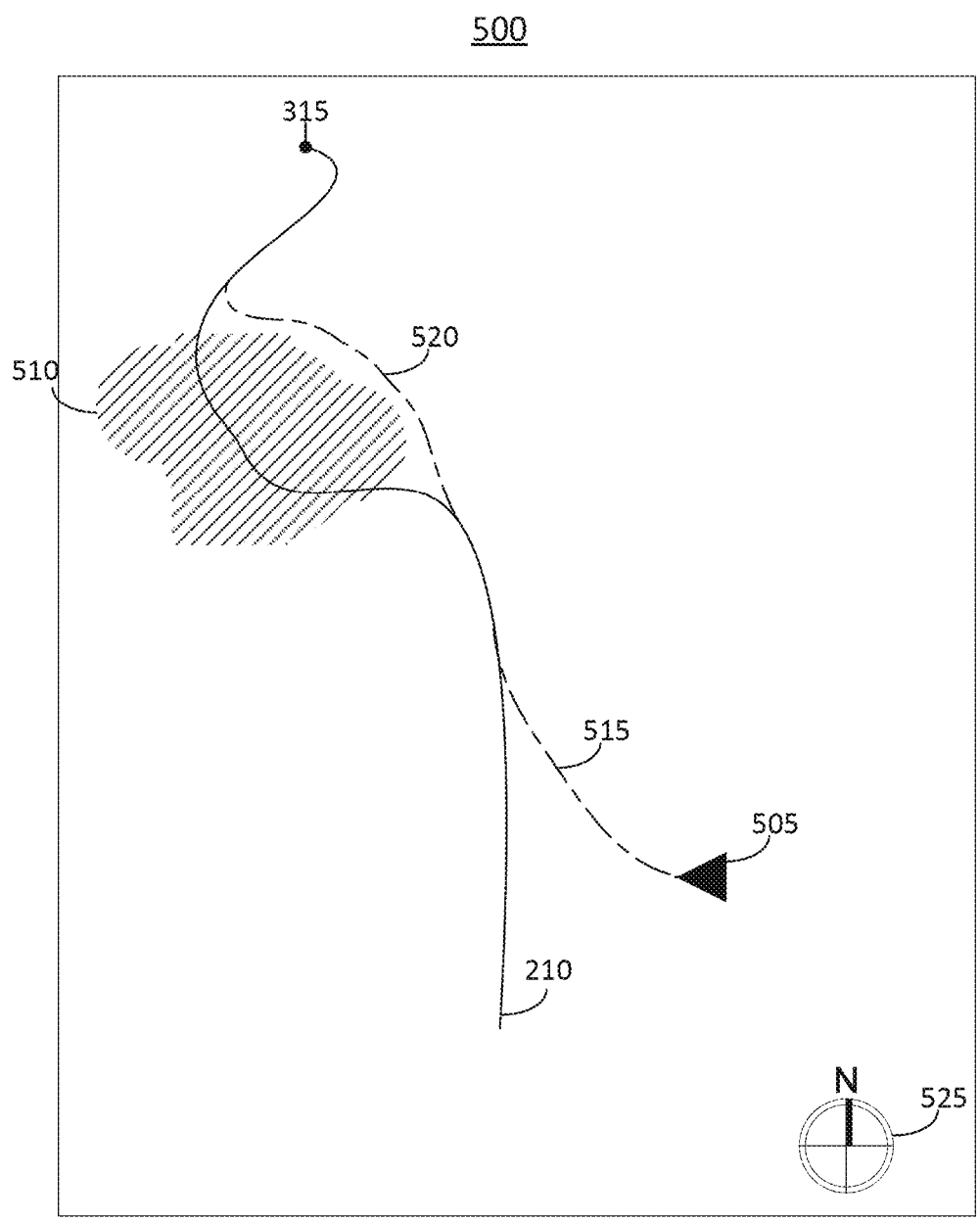
FIG. 5 illustrates an example graphical user interface for an aerial vehicle, in accordance with one or more implementations.

Referring to FIG. 5, a graphical user interface (GUI) 500 is illustrated in accordance with one or more implementations. The vehicle interface 102 can include various output devices, such as the GUI 500. The vehicle interface 102 can include any type of device capable of presenting information to an operator of the aerial vehicle 505 (e.g., a human operator or an autonomous flight control system). The GUI 500 can be positioned within the aerial vehicle 505 such that it can be accessed by the operator during operation of the aerial vehicle 505, or can be remote from the vehicle, such that it can be accessed by a remote operator. The graphical user interface 500 can include devices that present specific sensor information, such as speed, direction, velocity, or location. The GUI 500 can present information related to the environment. For example, the GUI 500 can display a two-dimensional (2D) or three-dimensional (3D) representation of the environment, such as according to features present in a world model 122 or features detected by vehicle sensors 108.

The GUI 500 depicts an aerial vehicle 505. The aerial vehicle 505 can be any type of aerial vehicle 505, such as an airplane, a helicopter, a drone, a vertical take-off and landing (VTOL) aircraft, or any other type of aerial vehicle 505. The aerial vehicle 505 can also be referred to as an aircraft. The aerial vehicle 505 can be operated by one or more pilots, for example, using the vehicle interface 102, or can be piloted autonomously. The aerial vehicle 505 can be equipped with any type of device or system that can be used to complete a task or mission that has been assigned to the aerial vehicle 505. The aerial vehicle 505 can include one or more communications interfaces, via which the aerial vehicle 505 or the vehicle interface 102 can transmit or receive information, including any of the information used in the techniques described herein.

The GUI 500 depicts the aerial vehicle 505 as deviated from a route 210, and an obstacle 510 along the route 210. The GUI 500 depicts a first return path 515 from the position of the aerial vehicle 505 to the route 210, and a second return path 520 which departs from the route 210, avoids the obstacle 510, and returns to the route 210. Although depicted via the GUI 500 for ease of presentation, the data processing system 100 can generate or employ return paths to merge with a route 210, or avoid obstacles 510 according to the present disclosure regardless of a presence of a graphical user interface 500. Obstacles 510 can include terrain features, environmental objects, other vehicles, or restricted airspace. The graphical user interface 500 can include one or more directional orientations 525. For example, the directional orientation 525 can include an ordinal direction, a direction to a waypoint, or the like. The local sensor data 124 or world model 122 can include obstacle 510 information such as a height, size, or priority of an obstacle 510.

The route generator 104 can generate the route 210, the first return path 515, or the second return path 520 based on a search-based, sample-based, or optimization-based algorithm, as discussed above. For example, a predictive based motion planning techniques such as model predictive control (MPC) or closed loop RRT (CL-RRT) can generate various return paths or routes 210 satisfying kino dynamic constraints 126 associated with the aerial vehicle 505. The vector field analyzer 106 can select at least one path according to a cost function such as a dot product of a vector field 305 and a direction of travel with respect to the vector field 305. The route generator 104 can generate the first return path 515 incident to a generation of the vector field 305, a deviation from the route 210 in excess of a threshold, or a release of an autonomy inceptor. The route generator 104 can generate the second return path 520 incident to a detection of the obstacle 510. The obstacle 510 can be detected based on local sensor data 124, world model 122 data, or a manual entry thereof.

Figure 6:
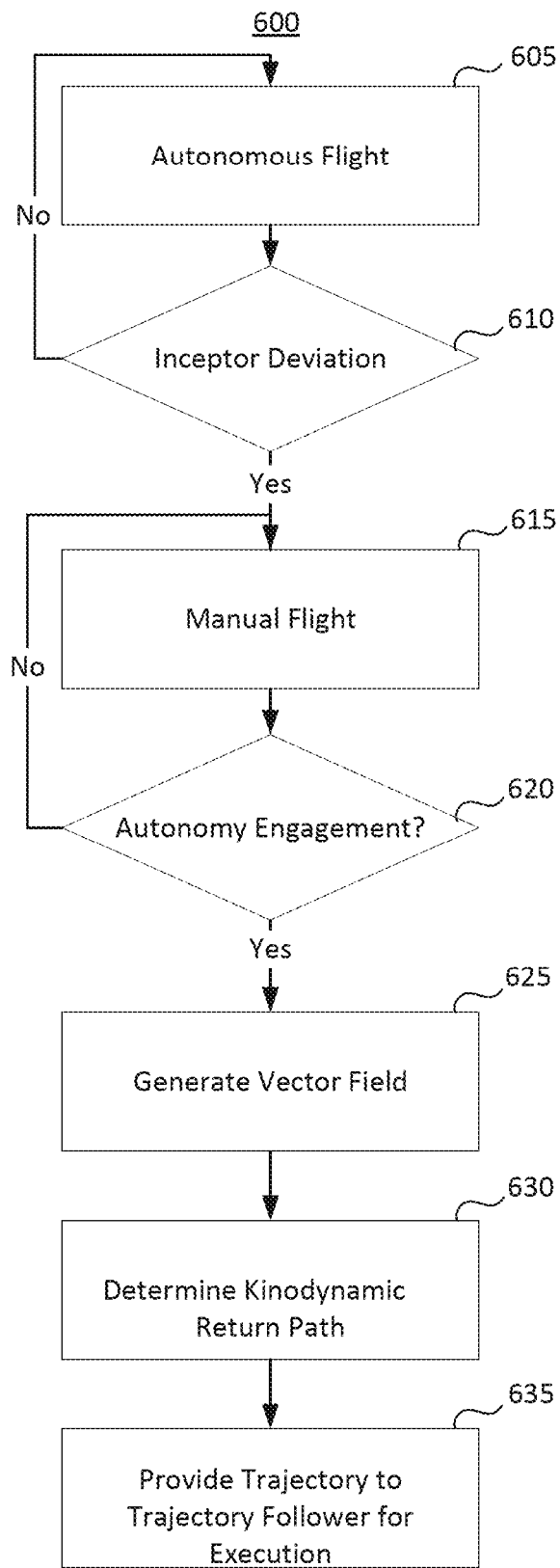
FIG. 6 illustrates a flow diagram for navigation of an aerial vehicle, in accordance with one or more implementations.

Referring now to FIG. 6, a flow diagram for a method 600 of navigation of an aerial vehicle 505 is illustrated, in accordance with one or more implementations. The method 600 can be executed, performed, or otherwise carried out by the data processing system 100, the computer system 800 described herein in conjunction with FIG. 8, or any other computing devices described herein. In brief overview, the method 600 can include engaging in autonomous flight (ACT 605), detecting a deviation from autonomous flight (ACT 610), engaging in manual flight operations (ACT 615), detecting a condition indicative of an engagement of an autonomous operation (ACT 620), generating a vector field 305 (ACT 625), determining kinodynamic return path (ACT 630), and providing the trajectory to return to the route 210 (ACT 635).

In further detail, the method 600 can include engaging in autonomous flight (ACT 605). For example, the aerial vehicle 505 can proceed autonomously along a predefined route 210 by conveying a route 210 to a trajectory follower 110 to navigate the route 210. During autonomous operation, the aerial vehicle 505 can navigate the route 210, detect a position of the aerial vehicle 505 relative to the route 210 (e.g., to detect a deviation therefrom), or detect an obstacle 510 along the route 210.

The method 600 can include detecting a deviation from autonomous flight (ACT 610). The data processing system 100 can detect the deviation based on a position of the aerial vehicle 505 (e.g., as detected by a vehicle sensor 108). The data processing system 100 can detect the deviation based on an input received at the vehicle interface 102. A manual entry to exit automated operation can be received by the vehicle interface 102. An inceptor such as an inceptor configured to manually control a portion of the aerial vehicle 505 in a manual mode of operation, or an autonomy inceptor configured to adjust a course or position of the aerial vehicle 505 in a semi-autonomous mode of operation can receive an input. The data processing system 100 can enter a manual or semi-autonomous mode responsive to the detection of the input.

The method 600 can include engaging in manual flight operations (ACT 615). For example, the data processing system 100 (e.g., the trajectory follower 110) can cause a displacement from the route 210 responsive to the input of an autonomy inceptor. The data processing system 100 can monitor the status of the autonomy inceptor during manual flight operations to maintain a manual or semi-autonomous state. The method 600 can include detecting a condition indicative of an engagement of an autonomous operation (ACT 620). For example, a manual entry to resume automated operation can be received by the vehicle interface 102. The vehicle interface 102 can detect a lack of input to a control such as the autonomy inceptor. For example, the vehicle interface 102 can detect the autonomy inceptor is at a neutral position, or a lack of a change of input to the autonomy inceptor for a predefined amount of time, travel distance, proximity to an obstacle 510, elevation, a status of an attention monitoring system for a pilot, or other conditions.

The method 600 can include generating a vector field 305 (ACT 625). For example, the vector field analyzer 106 can generate the vector field 305 responsive to the determination that the aerial vehicle 505 has deviated from the route 210, or responsive to the determination of the condition indicative of the engagement of autonomous operation. The vector field analyzer 106 can generate the vector field 305 around a radius or square around the aerial vehicle 505, the route 210, or an obstacle 510. The vector field analyzer 106 can generate the vector field 305 or a portion thereof (e.g., the gridline spacing) based on the speed, distance deviated from the route 210, or a condition of the environment.

The method 600 can include determining a kinodynamic return path (ACT 630). The route generator 104 can determine one or more return paths to the route 210. For example, the route generator 104 can employ a CL-RRT to generate various return paths, and convey the return paths to the vector field analyzer 106. The vector field analyzer 106 can determine a cost of the return paths based on a comparison of the directional vectors of the return path with the vector field 305. The vector field analyzer 106 can select a return path based on the cost of the return path in comparison to other return paths, or to a threshold. For example, a first return path having a cost below a cost threshold can be selected, or a lowest cost return path can be selected. A return path can be selected iteratively. For example, a first return path can be conveyed to the trajectory follower 110. The data processing system 100 can continue to execute the method 600 to determine a lower cost return path, and adjust the return path upon a generation thereof by providing the updated return path to the trajectory follower 110.

The method 600 can include providing the trajectory to return to the route 210 to the trajectory follower (ACT 635). The trajectory follower 110 can follow the trajectory to traverse the return path to return to the route 210. For example, the trajectory follower 110 can actuate portions of the aerial vehicle 505 to cause adjustments to the thrust, attitude, or control surfaces of the aerial vehicle 505 to cause the aerial vehicle 505 to navigate the return path to the route 210. The return path and the route 210 can be maintained or received by the trajectory follower 110, or the trajectory follower 110 can receive an updated route 210, including the return path portion.

Figure 7:
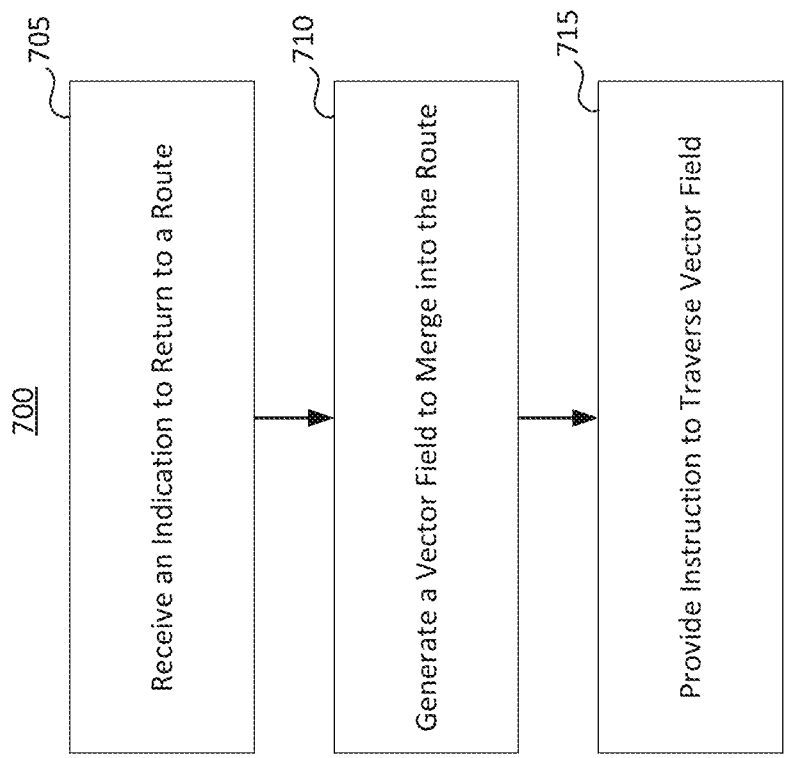
FIG. 7 illustrates another flow diagram for navigation of an aerial vehicle, in accordance with one or more implementations.

Referring now to FIG. 7, a flow diagram for a method 700 of navigation of an aerial vehicle 505 is illustrated, in accordance with one or more implementations. The method 700 can be executed, performed, or otherwise carried out by the data processing system 100, the computer system 800 described herein in conjunction with FIG. 8, or any other computing devices described herein. In brief overview, the method 800 can include receiving an indication to return to a route 210 (ACT 705), generating a vector field 305 to merge into the route 210 (ACT 710), or providing instructions to traverse the vector field 305 (ACT 715).

In further detail, the method 700 can include receiving an indication to return to a route 210 (ACT 705). The route 210 can include a destination 315. The indication to return to the route 210 can be generated responsive to a detection of an obstacle 510 along the route 210, such that the aerial vehicle 505 can receive the indication prior to departing from a path of travel along the route 210, or based on a deviation of the aerial vehicle 505 from the route 210. For example, the indication can be received responsive to a detection, by the vehicle interface 102, that a manual mode of operation is no longer indicated, based on various control inputs or a lack thereof.

The method 700 can include generating a vector field 305 to merge into the route 210 (ACT 710). For example, a vector field analyzer 106 can generate the vector field 305 responsive to the indication to return to the route 210. The vector field analyzer 106 can receive various return paths to the route 210 from the route generator 104, and select a route 210 therefrom. For example, the vector field analyzer 106 can determine a cost associated with the return paths, and select a return path having a lowest cost.

The method 700 can include providing instructions to traverse the vector field 305 (ACT 715). For example, the trajectory follower 110 can generate instructions to traverse a provided route 210, or to navigate along a series of waypoints, headings, or other instructions provided thereto. The trajectory follower 110 can steer the aircraft towards the destination 315. For example, the trajectory follower 110 can steer the aircraft along the route 210, such as merging to the route 210 on a return path. The return path can follow along one or more vectors of the vector field 305. For example, the return path can be parallel to, overlaid with, or at an acute angle with a vector of the vector field 305 (e.g., the return path can be a low-cost path).

Figure 8:
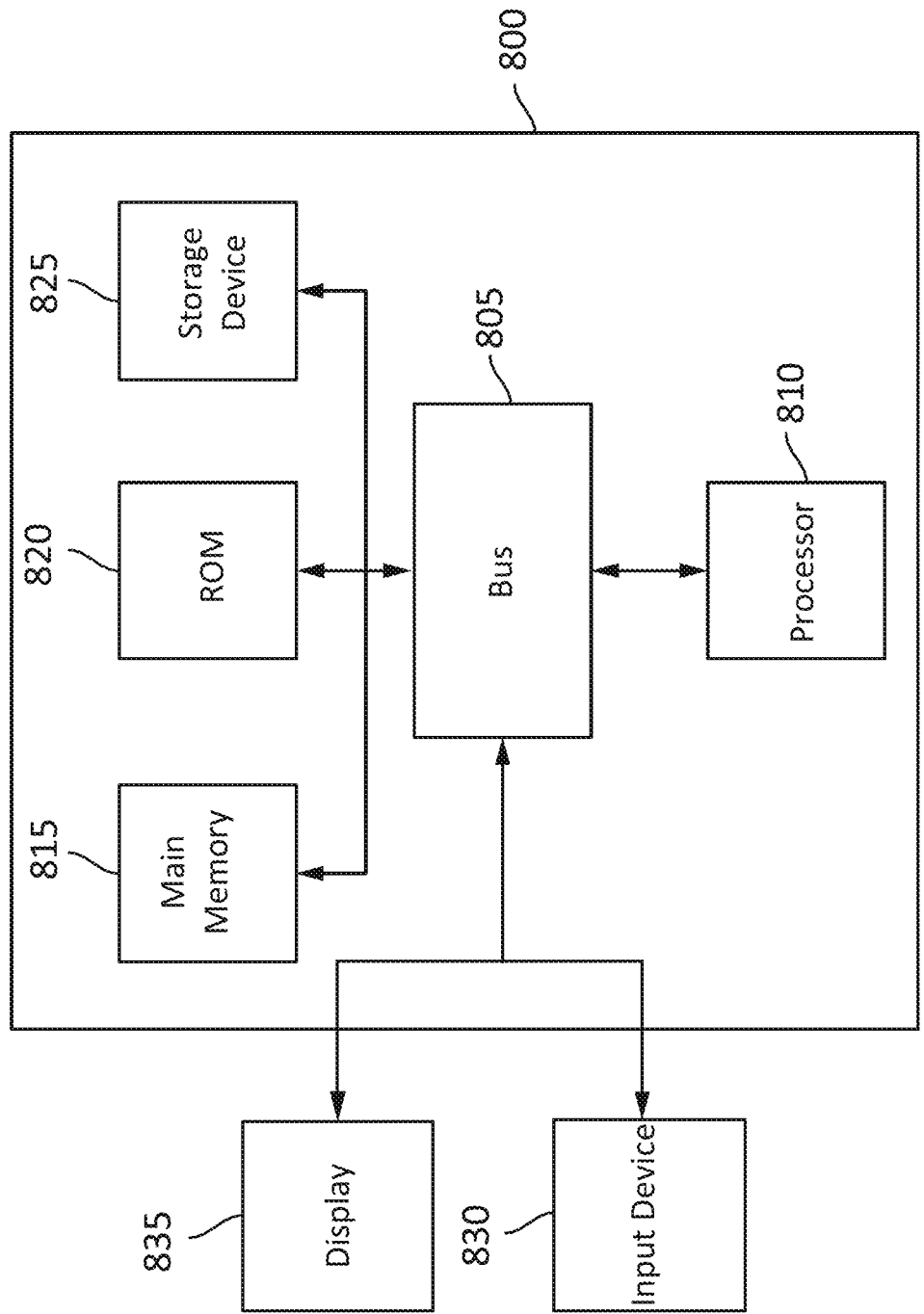
FIG. 8 illustrates a block diagram of an example computer system useful in implementing one or more components detailed herein.

Referring now to FIG. 8, depicted is a block diagram of an example computer system 800. The computer system or computing device 800 can include or be used to implement the data processing system 100, or its components. The computing system 800 includes at least one bus 805 or other communication component for communicating information and at least one processor 810 or processing circuit coupled to the bus 805 for processing information. The computing system 800 can also include one or more processors 810 or processing circuits coupled to the bus 805 for processing information. The computing system 800 also includes at least one main memory 815, such as a random access memory (RAM) or other dynamic storage device, coupled to the bus 805 for storing information, and instructions to be executed by the processor 810. The computing system 800 can further include at least one read only memory (ROM) 820 or other static storage device coupled to the bus 805 for storing static information and instructions for the processor 810. A storage device 825, such as a solid state device, magnetic disk, or optical disk, can be coupled to the bus 805 to persistently store information and instructions.

The computing system 800 can be coupled via the bus 805 to a display 835, such as a liquid crystal display, or active matrix display, for displaying information to a user such as an administrator of the data processing system 100. An input device 830, such as a keyboard or voice interface can be coupled to the bus 805 for communicating information and commands to the processor 810. The input device 830 can include a touch screen display 835. The input device 830 can also include a cursor control, such as a mouse, a trackball, or cursor direction keys, for communicating direction information and command selections to the processor 810 and for controlling cursor movement on the display 835. The display 835 can be part of the display devices 835, or other components of FIG. 8.

The processes, systems, and methods described herein can be implemented by the computing system 800 in response to the processor 810 executing an arrangement of instructions contained in main memory 815. Such instructions can be read into main memory 815 from another computer-readable medium, such as the storage device 825. Execution of the arrangement of instructions contained in main memory 815 causes the computing system 800 to perform the illustrative processes described herein. One or more processors in a multi-processing arrangement can also be employed to execute the instructions contained in main memory 815. Hard-wired circuitry can be used in place of or in combination with software instructions together with the systems and methods described herein. Systems and methods described herein are not limited to any specific combination of hardware circuitry and software.

Although an example computing system has been described in FIG. 8, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components and illustrates one grouping of operations and responsibilities of these system components. Other groupings that execute similar overall operations are understood to be within the scope of the present application. Modules can be implemented in hardware or as computer instructions on a non-transient computer readable storage medium, and modules can be distributed across various hardware- or computer-based components.

The systems described above can provide multiple ones of any or each of those components, and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to a suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device," "component," or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array), a GPU, or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services and/or distributed computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array), a GPU, or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements, and features discussed in connection with one implementation are not intended to be excluded from a similar role in other implementations or implementations.

The phraseology and terminology used herein is for the purpose of description and should not be regarded as limiting. The use of "including," "comprising," "having," "containing," "involving," "characterized by," "characterized in that," and variations thereof herein is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

References to "or" can be construed as inclusive so that any terms described using "or" can indicate any of a single, more than one, and all of the described terms. For example, a reference to "at least one of 'A' and 'B'" can include only "A," only "B," as well as both "A" and "B." Such references used in conjunction with "comprising" or other open terminology can include additional items.

Where technical features in the drawings, detailed description or any claims are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, and orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein can be embodied in other specific forms without departing from the characteristics thereof. Scope of the systems and methods described herein is thus indicated by the appended claims, rather than the foregoing description, and changes that come within the meaning and range of equivalency of the claims are embraced therein.

While this specification contains many specific implementation details, these should not be construed as limitations on the scope of any inventions or of what can be claimed, but rather as descriptions of features specific to particular embodiments of particular aspects. Certain features described in this specification in the context of separate embodiments can also be implemented in combination in a single embodiment. Conversely, various features described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated in a single software product or packaged into multiple software products.

Thus, particular embodiments of the subject matter have been described. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A system, comprising:
a data processing system of an aircraft, the data processing system comprising one or more processors coupled with memory to:
receive an indication to return to a route generated for autonomous navigation by the aircraft to a destination;
generate, responsive to the indication to return to the route, a vector field formed of a plurality of vectors that merge into the route;
provide, based on a cost function applied to the vector field, instructions to steer the aircraft toward the destination along the route via one or more vectors of the plurality of vectors in the vector field; and
cause the aircraft to navigate in accordance with the instructions.

2. The system of claim 1, wherein the data processing system is further configured to:
generate the instructions for the one or more vectors based on kino dynamic constraints of the aircraft.

3. The system of claim 1, wherein each vector of the plurality of vectors comprises a respective direction for each respective point in an environment surrounding the aircraft configured to steer the aircraft towards the destination via the route.

4. The system of claim 1, wherein the data processing system is further configured to:
generate the vector field for an environment having a radius surrounding the aircraft.

5. The system of claim 1, wherein the data processing system is further configured to:
generate the instructions to steer the aircraft via the one or more vectors to minimize the cost function.

6. The system of claim 1, wherein the data processing system is further configured to:
generate the instructions to steer the aircraft via the one or more vectors to reduce the cost function below a threshold.

7. The system of claim 1, wherein the data processing system is further configured to:
generate the instructions for the one or more vectors with a closed loop rapidly exploring random technique configured with constraints for the aircraft.

8. The system of claim 1, wherein the data processing system is further configured to:
generate the instructions to steer the aircraft via the one or more vectors that avoid an obstacle in an environment centered around the aircraft.

9. The system of claim 1, wherein the data processing system is further configured to:
enter a manual mode in which an operator of the aircraft navigates the aircraft via one or more inceptors; and
detect the indication to transition from the manual mode to an autonomous mode in which the aircraft autonomously navigates along the route.

10. The system of claim 9, wherein the data processing system is further configured to:
detect the indication responsive to release by the operator of the one or more inceptors for a predetermined duration.

11. The system of claim 1, wherein the data processing system is further configured to:
detect the indication responsive to an input via a user interface of the aircraft.

12. A method, comprising:
receiving, by a data processing system of an aircraft comprising one or more processors coupled with memory, an indication to return to a route generated for autonomous navigation by the aircraft to a destination;
generating, by the data processing system, responsive to the indication to return to the route, a vector field formed of a plurality of vectors that merge into the route;
providing, by the data processing system based on a cost function applied to the vector field, instructions to steer the aircraft toward the destination along the route via one or more vectors of the plurality of vectors in the vector field; and
causing, by the data processing system, the aircraft to navigate in accordance with the instructions.

13. The method of claim 12, comprising:
generating, by the data processing system, the instructions for the one or more vectors based on kino dynamic constraints of the aircraft.

14. The method of claim 12, wherein each vector of the plurality of vectors comprises a respective direction for each respective point in an environment surrounding the aircraft configured to steer the aircraft towards the destination via the route.

15. The method of claim 12, comprising:
generating, by the data processing system, the vector field for an environment having a radius surrounding the aircraft.

16. The method of claim 12, comprising:
generating, by the data processing system, the instructions to steer the aircraft via the one or more vectors to minimize the cost function.

17. An aircraft, comprising:
a data processing system comprising one or more processors coupled with memory to: receive an indication to return to a route generated for autonomous navigation by the aircraft to a destination;

generate, responsive to the indication to return to the route, a vector field formed of a plurality of vectors that merge into the route;

provide, based on a cost function applied to the vector field, instructions to steer the aircraft toward the destination along the route via one or more vectors of the plurality of vectors in the vector field; and cause the aircraft to navigate in accordance with the instructions.

18. The aircraft of claim 17, wherein the data processing system is further configured to:

generate the instructions for the one or more vectors based on kino dynamic constraints of the aircraft.

\* \* \* \* \*